Patented Apr. 10, 1934

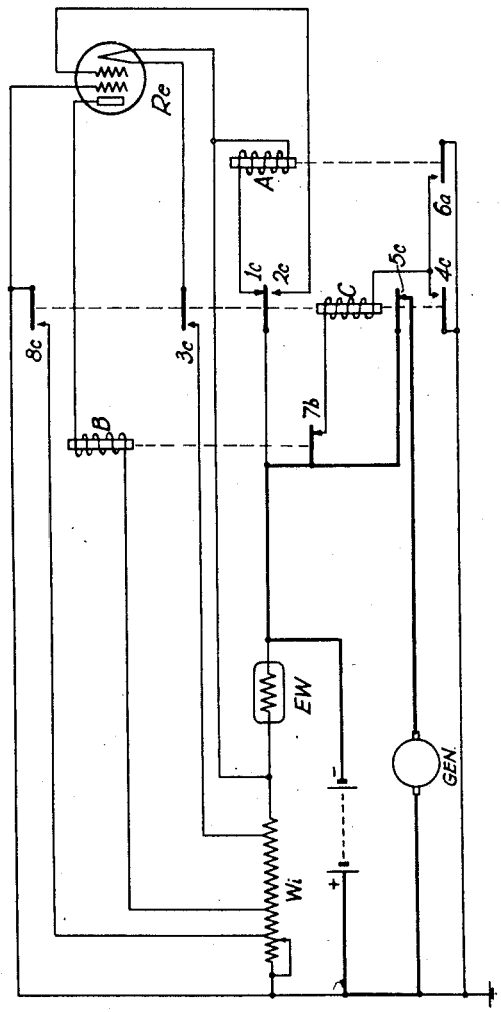

1,954,110

UNITED STATES PATENT OFFICE 1,954,110

AUTOMATIC BATTERY CHARGING SYSTEM

Alfred Wiessner, Berlin, Germany, assignor to Siemens & Halske Aktiengesellschaft of Wernerwerk, Siemensstadt, near Berlin, Germany Application May 12, 1930, Serial No. 451,879
In Germany July 18, 1929

10 Claims. (Cl. 171—314)

The present invention relates to automatic battery charging systems.

In order that a relay shall pull up or fall back at a quite particular voltage, it is necessary for it to be very accurately adjusted. One avoids this as far as possible, because there is great difficulty in constructing such relays and such relays work very inexactly after they have been in use for some time and are affected by temperature variations.

The present invention shows the possibility of operating relays at a quite definite voltage, as is required for example for switching batteries on and off from the charging source especially in telephone systems. This is achieved by connecting an iron in hydrogen resistance in parallel with the relay winding, whereby a sudden rise or fall of the voltage at the ends of the relay winding is brought about when the working voltage reaches a particular value and thus the relay is caused to pull up or fall back.

In the drawing is shown one method of carrying out the invention. Only those circuit details are shown that are required for understanding the invention. The invention is not limited to the example shown.

In the example shown, the voltage rise and fall at the ends of the iron in hydrogen resistance is caused to affect relays used for switching a battery to a charging source at a definite minimum voltage and to switch it off at a definite maximum voltage.

According to the invention instead of making use of the feature of an iron in hydrogen resistance to let through a certain current only within a certain range of voltages, it makes use of the feature that at a working voltage lying outside the proper voltage range of the resistance there appears at the terminals of an iron in hydrogen resistance a sudden increase in potential difference when the working voltage rises or a sudden drop in potential difference when the working voltage sinks.

The relay, which is connected in parallel with the iron in hydrogen resistance, must have the highest possible resistance, as the voltage rise at the terminals of the iron in hydrogen resistance becomes less as the resistance connected in parallel with it is reduced.

In the drawing the iron in hydrogen resistance EW and the resistance Wi lie in a circuit of the battery to be charged. At the contact 5c the battery is switched on or off from a charging source, such as generator GEN. At Re is shown diagrammatically a double grid amplifier valve, whose operation will be explained later on.

Assuming that the battery is being charged, and that therefore the contact 5c is closed, the battery is to be switched off when the working voltage of the battery reaches a certain value, which acts on the iron in hydrogen resistance EW. By regulating the resistance Wi, it is possible to adjust the voltage for the iron in hydrogen resistance at which occurs the above described action, that is, as the battery voltage rises on approaching full charge the current through resistance EW causes it to heat rapidly and thus its resistance and potential drop increase rapidly at the critical voltage. When this voltage is reached during the charging of the battery, the sudden rise of the potential difference causes the relay A connected to the terminals of the iron in hydrogen resistance to operate, and at its contact 6a it closes the following circuit for the relay C: negative pole of the battery, contact 7b, winding of relay C, contact 6a, to the grounded positive pole of the battery. At contact 4c the relay C keeps itself connected to earth, and at contact 5c it opens the charging circuit from generator GEN to the battery, thus interrupting the charge. The opening of contact 1c causes the relay A to fall back, and over the closed contact 2c is applied to the grid of the double grid valve Re the voltage appearing at the ends of the iron in hydrogen resistance. Contact 3c closes the heating circuit of the amplifier valve but the negative bias on the grid of the tube prevents the flow of plate current at this time. Contact 8c short circuits a part of the resistance Wi, thereby is reduced the voltage at which the iron in hydrogen resistance is to function. The reason for this is that the battery is to be again connected to the charging source when the battery reaches its lowest voltage.

When the discharge has caused the voltage of the battery to sink to this point, a sudden drop of potential occurs across the iron in hydrogen resistance, and reduces the bias on the grid of the amplifier valve. The anode current which now begins to flow, acts on the winding of relay B, which opens its contact 7b, thereby releasing the relay C by opening its locking circuit. Relay C now closes the charging circuit at contact 5c and the charging of the battery begins again. The opening of contact 3c opens the filament circuit of tube Re. At contact 1c, relay A is again bridged across the iron in hydrogen resistance EW preparatory to again cutting off the charge when the voltage of the battery reaches the critical value.

A valve has been used in order that the drop in potential shall cause a relay to pull up instead of fall back to start the charging of the battery.

Hereby an automatic arrangement for charging batteries has been provided, and it is possible for the battery to be switched on and off from the charging source within quite definite voltage limits.

What is claimed is:

1. In combination, a battery, a charging circuit for said battery, an electron tube having its filament connected across a portion of said battery, circuit arrangement whereby the negative pole of said battery is connected to the grid of said tube to limit the plate current, a plate circuit including said battery and a plate relay operated responsive to the increase in plate current when the battery potential drops to a predetermined value and reduces the negative potential on the grid of said tube, and means controlled by said plate relay for closing said charging circuit.

2. In combination, a battery, a charging circuit for said battery, an iron in hydrogen resistance bridged across said battery, an electron tube, circuit arrangements such that the voltage drop across said resistance is impressed on the grid of said tube, a plate circuit for said tube including a source of current, a relay in said circuit operative responsive to the decrease in potential on the grid of said tube due to the sudden drop in potential across said resistance when the battery voltage drops to a predetermined value, and means controlled by said relay for closing said charging circuit.

3. In combination, a battery, an iron in hydrogen resistance bridged across said battery in series with a variable resistance, a charging circuit for said battery, a relay bridged across said iron in hydrogen resistance, means including said relay for opening said charging circuit when the battery voltage rises to a predetermined value, an electron tube, and means including said electron tube for again closing said charging circuit when the battery voltage drops to a different predetermined value.

4. In combination, a battery, a charging circuit for said battery, an iron in hydrogen resistance bridged across said battery, a relay connected in parallel with said resistance and operative when the battery voltage rises to a predetermined value, means responsive to the operation of said relay for opening said charging circuit, an electron tube, a plate circuit for said tube including a source of current, a plate relay in said circuit, circuit arrangements such that said plate relay is operated when the battery voltage drops to a different predetermined value, and means responsive to the operation of said plate relay for again closing said charging circuit.

5. In combination, a battery, a variable resistance, and an iron in hydrogen resistance connected in series, a charging circuit for said battery, a relay bridged across said iron in hydrogen resistance, a second relay controlled by said first relay for opening said charging circuit, a locking circuit for said second relay, an electron tube, said tube having grid, filament, and plate elements, a filament circuit, a plate circuit, contacts on said second relay for closing the filament circuit of said tube and for connecting the grid of said tube to said iron in hydrogen resistance in place of said first relay, a plate relay in said plate circuit operative responsive to the reduction in grid potential caused by a sudden drop in potential across said iron in hydrogen resistance when the battery voltage drops to a predetermined value, and contacts on said plate relay for opening the locking circuit of said second relay.

6. In combination, a battery, a charging circuit for said battery, a resistance connected to said battery so that a fraction of the battery voltage is impressed thereon, said resistance having the characteristic of suddenly increasing its voltage drop when the voltage across its terminals increases to a predetermined value and of suddenly decreasing its voltage drop when the voltage impressed on its terminals decreases to a predetermined value, means responsive to a sudden rise in voltage drop across said resistance for opening said charging circuit, means responsive to a sudden decrease in voltage drop across said resistance for closing said charging circuit, and means effective when said charging circuit is opened for increasing the fraction of the battery voltage impressed on said resistance so that said circuit closing means operates at a lower battery voltage than said circuit opening means.

7. In combination, a battery, a charging circuit for said battery, an iron in hydrogen resistance permanently bridged across said battery in series with a variable resistance, a relay connected in multiple with said iron in hydrogen resistance and operative when the voltage of said battery reaches a predetermined value, means controlled by said relay for opening said charging circuit, means for again closing said charging circuit when the voltage of said battery reaches a second predetermined value, and means for short-circuiting a portion of said variable resistance when said charging circuit is opened so that said second predetermined value of battery voltage is less than said first value.

8. In combination, a battery, an iron in hydrogen resistance bridged across said battery in series with a variable resistance, a charging circuit for said battery, a relay bridged across said iron in hydrogen resistance, means including said relay for opening said charging circuit when the battery voltage rises to a predetermined value, an electron tube, means including said tube for closing said charging circuit, and means controlled by said relay for short-circuiting a portion of said variable resistance so that said circuit closing means operates at a predetermined value of battery voltage which is lower than said first predetermined value.

9. In combination, a battery, a resistance bridged across said battery, a charging circuit for said battery, an electron tube having its filament connected across a portion of said resistance and its grid connected to the negative pole of said battery, a plate circuit for said tube connected to said resistance at a point of more positive potential than the points at which the filament is connected, a relay in said plate circuit operated when the battery voltage decreases to a predetermined value and reduces the negative potential on the grid of said tube, and means controlled by said relay for closing said charging circuit.

10. In combination, a battery, a charging circuit for said battery, a relay, circuit arrangements such that a portion of the voltage of said battery is impressed on the terminals of said relay, an electron tube, means controlled by said relay when the voltage of said battery rises to a predetermined value for opening said charging circuit and for impressing said portion of the battery voltage on the grid of said tube, and means including said tube for again closing said charging circuit when the voltage of said battery drops to a different predetermined value.

ALFRED WIESSNER.